(12) United States Patent
Shao et al.

(10) Patent No.: US 11,827,156 B2
(45) Date of Patent: Nov. 28, 2023

(54) VEHICLE DOOR

(71) Applicant: AAC Microtech (Changzhou) Co., Ltd., Changzhou (CN)

(72) Inventors: Tao Shao, Shenzhen (CN); Xudong Yan, Shenzhen (CN); Xiaojiang Gu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/840,578

(22) Filed: Jun. 14, 2022

(65) Prior Publication Data
US 2023/0202405 A1 Jun. 29, 2023

(30) Foreign Application Priority Data
Dec. 29, 2021 (CN) .......................... 202123384733.4

(51) Int. Cl.
| | | |
|---|---|---|
| *B60R 11/02* | (2006.01) | |
| *H04R 1/02* | (2006.01) | |
| *H04R 1/28* | (2006.01) | |
| *B60R 11/00* | (2006.01) | |

(52) U.S. Cl.
CPC ............ *B60R 11/0217* (2013.01); *H04R 1/02* (2013.01); *H04R 1/2869* (2013.01); *B60R 2011/0021* (2013.01); *H04R 2499/13* (2013.01)

(58) Field of Classification Search
CPC .... H04R 1/02; H04R 1/2869; H04R 2499/13; H04R 1/2815; H04R 1/2819; B60R 11/0217; B60R 2011/0021
See application file for complete search history.

(56) References Cited

U.S. PATENT DOCUMENTS

| | | | | |
|---|---|---|---|---|
| 6,019,188 A | * | 2/2000 | Nevill ................ | H04R 1/2826 181/156 |
| 6,912,290 B1 | * | 6/2005 | Thorsell .............. | H04R 1/2826 181/185 |
| 8,132,642 B2 | * | 3/2012 | Takashima ........... | H04R 1/2857 381/301 |
| 2004/0120541 A1 | * | 6/2004 | Maekawa ............. | H04R 1/025 381/87 |
| 2009/0028370 A1 | * | 1/2009 | Matsumura ........... | H04R 3/002 381/86 |
| 2018/0251079 A1 | * | 9/2018 | Negishi ............... | H04R 5/02 |
| 2019/0141437 A1 | * | 5/2019 | Miki ................... | H04R 1/02 |

* cited by examiner

*Primary Examiner* — Jason R Kurr
(74) *Attorney, Agent, or Firm* — W&G Law Group

(57) ABSTRACT

The present invention relates to a vehicle door, which is installed on the vehicle. The door includes a shutter, a speaker and an inverted tube. The shutter has an accommodation cavity, and the speaker is installed in the shutter. The inverted tube is located in the accommodation cavity, with one end connected with the interior of the vehicle, and the other end forming an acoustic port with a flange. The inverted tube exports the sound from the rear cavity into the car. The inverted tube with the acoustic port can strengthen the resonance effect of the air, and strengthen the sound wave. It can improve the loudness of the speaker, reduce the noise of the airflow, and effectively improve the sound quality of the speaker.

10 Claims, 3 Drawing Sheets

VEHICLE DOOR

FIELD OF THE PRESENT DISCLOSURE

The present invention relates to the technical field of vehicle-mounted speakers, in particular to a vehicle door incorporating a speaker.

DESCRIPTION OF RELATED ART

The vehicle speaker is usually installed on the vehicle door and is an important component of the vehicle audio equipment. When the speaker's sound membrane vibrates back and forth, it can push the air in front of and behind the speaker to vibrate, thereby producing sound. Usually, the rear end of the speaker is located inside the vehicle door, and the inside of the vehicle door is the sealed chamber. This part of the sound wave energy radiated by the speaker towards the rear is wasted, resulting in lower loudness and poor sound quality of the vehicle-mounted speaker.

SUMMARY OF THE PRESENT INVENTION

The main purpose of the present invention is to provide a vehicle door to solve the problem of low loudness and poor sound quality of the vehicle speaker.

Accordingly, the present invention provides a vehicle door, installed on a vehicle, including: a shutter having an accommodation cavity; a speaker engaging with the shutter, including a sound membrane facing an interior of the vehicle, and a rear cavity under the sound membrane communicating with the accommodation cavity; an inverted tube located in the accommodation cavity with one end thereof connected with the interior of the vehicle and another end formed with an acoustic port facing the speaker along a circumference of the inverted tube. The acoustic port has a flange. The inverted tube exports the sound from the rear cavity into the vehicle so that the sound from the rear cavity is superimposed with sound from a front side of the sound membrane.

In addition, the flange forms a sunken pit.

In addition, a plurality of the sunken pits is irregularly distributed on the flange.

In addition, a diameter D1 of the loudspeaker mouth is 150 mm~300 mm.

In addition, a diameter D2 of the sunken pit is 2 mm~5 mm.

In addition, the shutter includes an inverted hole, and the inverted tube has one end fixedly connected with the inverted hole; a distance L1 from the inverted hole to the speaker is 250 mm~350 mm.

In addition, the inverted hole is a circle; and a diameter D3 of the inverted hole is 100 mm~150 mm.

In addition, the inverted tube includes a main body and an installation part, and the main body is a straight-line shape, wave shape or arc shape, the acoustic port is located in the main body.

In addition, the minimum distance L2 from the inverted tube to the bottom wall of the accommodation cavity is 20 mm~50 mm.

In addition, the vehicle door includes a noise reduction component in the inverted tube, wherein the noise reduction component is located at a middle part of the inverted tube, and is arranged along a radial direction of the inverted tube.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

It should be understood that the term "and/or" used in this document is only an association relationship to describe associated objects, indicating that there may be three kinds of relationships, for example, a and/or B, which may indicate: There are three cases where A exists alone, A and B exist at the same time, and B exists alone. In addition, the character "/" in this document generally indicates that the related objects are an "or" relationship.

It should be noted that the orientation words such as "up", "down", "left", and "right" described by the embodiment of the present invention are described in the angle shown by the attached figures which should not be construed as a limitation on the embodiment of the present invention. Also, in this context, it should also be understood that when an element is referred to as being "on" or "under" another element, it can not only be directly connected "on" or "under" the other element, but also Indirectly connected "on" or "under" another element through middle elements.

Figure 1:
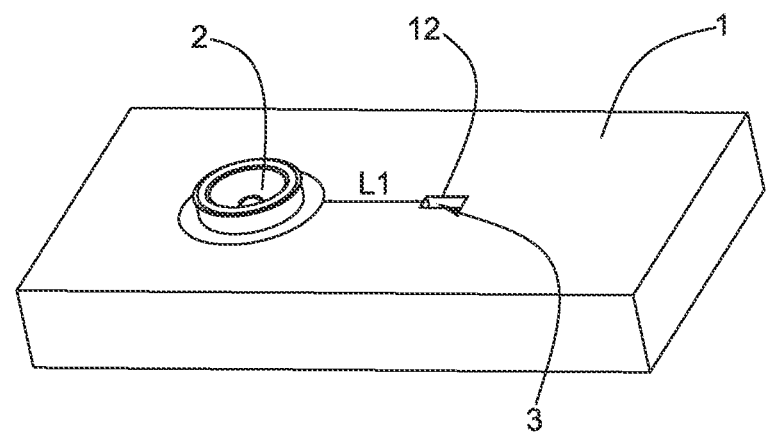
FIG. 1 is a simplified isometric view of a vehicle door in accordance with an embodiment of the present invention.
Figure 2:
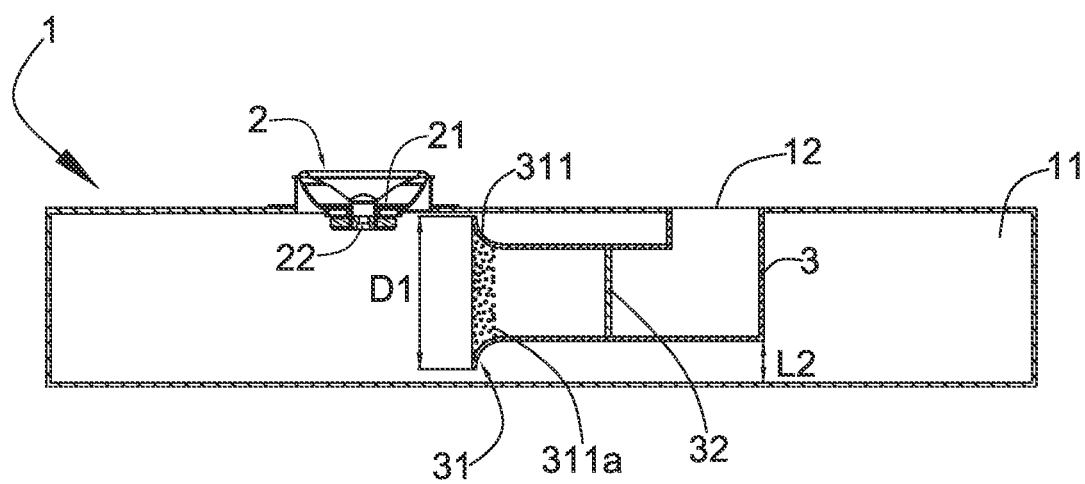
FIG. 2 is a cross-sectional view of the vehicle door in FIG. 1.

The embodiment of the present invention provides a vehicle door, which is installed on a vehicle, as shown in FIG. 1 and FIG. 2, the vehicle door includes a shutter 2, a speaker 2 and an inverted tube 3, wherein the shutter 1 is provided with an accommodation cavity 11. The speaker 2 is attached to the shutter 1. The speaker 2 includes a sound membrane 21 facing the interior of the vehicle and a rear cavity 22 located below the sound membrane 21. The rear cavity 22 is connected with the accommodation cavity 11, the inverted tube 3 is located in the accommodation cavity 11, one end of the inverted tube 3 is connected with the interior of the vehicle, and the other end is provided with an acoustic port 31 facing the speaker 2. Along the circumferential direction of the inverted tube 3, the acoustic port 31 is provided with a flange 311, and the size of the flange 311 gradually increases in the direction toward the speaker 2. The inverted tube 3 exports the sound from rear cavity 22 into the vehicle so that the sound from rear cavity 22 is superimposed with the sound from the front side of sound membrane 21.

In this embodiment, when the sound membrane 21 of the speaker 2 vibrates, the air in the rear cavity 22 below the sound membrane 21 will also vibrate. The rear cavity 22 is connected with the accommodation cavity 11, so that the vibrating air flows into the accommodation cavity 11. The inverted tube 3 can connect the accommodation cavity 11 and the inside of the vehicle, and utilize the vibration of the speaker 2 rear cavity 22. The gas in the back of the speaker 2 is compressed by vibration to generate resonance and push the gas in the inverted tube 3 to resonate and move outward.

The sound wave behind the speaker 2 is superimposed with the sound wave in front of the speaker 2, so as to strengthen the sound wave and improve the loudness of the speaker 2. The end of the inverted tube 3 facing the speaker 2 is provided with a acoustic port, and the acoustic port 31 is a smooth curve structure. When the air behind the speaker 2 flows through the acoustic port 31 and enters the inverted tube 3, the bending speed of the airflow can be reduced to avoid the occurrence of the sound of rapid airflow friction. Therefore, the noise of the airflow can be reduced, the sound purity can be improved, and the sound quality of the speaker 2 can be effectively improved.

Specifically, the acoustic port 31 is provided with a flange 311 extending outward, so that the diameter of the airflow inlet of the inverted tube 3 is larger than the tube diameter of the inverted tube 3, and the resonant wave of the air is conducted through the acoustic port 31 into the inverted tube 3. As the diameter of the airflow inlet gradually decreases, the resonance effect of the air is enhanced, and the gas in the accommodation cavity 11 promotes the gas in the inverted tube 3, which makes the air resonance in the inverted tube 3 more intense. Thereby, the sound waves of the speaker 2 can be strengthened, and the loudness of the speaker 2 can be improved.

Wherein, the material of the inverted tube 3 can be metal, PVC, hard plastic or glass fiber, etc.; also, a reinforcing rib can be set on the outer wall of the inverted tube 3 to improve the strength of the inverted tube 3 and avoid the occurrence of the inverted tube 3 during the working process deformation, improve the working life of the inverted tube 3.

Figure 3:
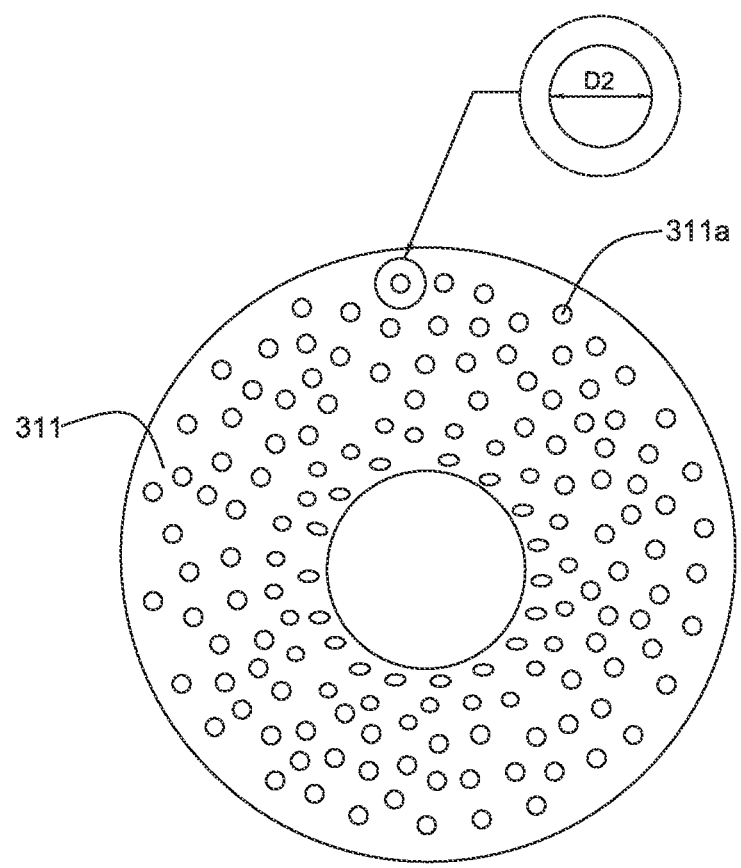
FIG. 3 illustrates an acoustic port of the vehicle door.

In a specific embodiment, as shown in FIG. 2 and FIG. 3, the flange 311 is provided with a sunken pit 311a. In this embodiment, a sunken pit 311a is installed on the inner wall of the acoustic port 31.

Increase the viscosity of the airflow attached to the surface of the acoustic port 31, reduce the air flow rate, in this way, the air in the inverted tube 3 can maintain or approach a laminar flow state, the resonance efficiency of inverted tube 3 and the sound quality of speaker 2 can be improved.

Specifically, as shown in FIG. 2 and FIG. 3, multiple sunken pits 311a are irregularly distributed on the flange 311.

In this embodiment, a plurality of sunken pits 311a are irregularly distributed along the circumferential direction of the flange 311, and the spacing of the sunken pits 311a may be the same or different. The multiple sunken pits 311a can enhance the interference effect of the acoustic port 31 on the nearby air flow, so that the air entering the inverted tube 3 can maintain a laminar flow state as much as possible, thereby further improving the loudness and sound quality of the speaker 2.

The diameters of the plurality of sunken pits 311a may be the same or different. In a specific embodiment, as shown in FIG. 2, the diameter D1 of the loudspeaker mouth 31 is 150 mm~300 mm. For example, the diameter D1 of the loudspeaker mouth 31 may specifically be 150 mm, 200 mm, 250 mm, 300 mm and so on.

In this embodiment, when the diameter D3 of the acoustic port 31 is 150 mm~300 mm, the inverted tube 3 is close to one end of the speaker 2, that is, the cross-sectional area of the inlet of the inverted tube 3 is similar to the effective vibration area of the speaker 2, which can effectively strengthen the air in the inverted tube 3 resonance effect. Thereby, the sound waves are strengthened and the loudness of the speaker 2 is improved.

In a specific embodiment, as shown in FIG. 3, the diameter D2 of the sunken pit 311a is 2 mm~5 mm. For example, the diameter D2 of the sunken pit 311a may specifically be 2 mm, 3 mm, 4 mm, 5 mm and so on.

In this embodiment, when the diameter D2 of the sunken pit 311a is too small (for example, less than 2 mm), the requirements for process accuracy are high, the processing difficulty is too large, and it is inconvenient to manufacture, which increases the production cost of the inverted tube 3. When the diameter D2 of the sunken pit 311a is too large (for example, larger than 5 mm), the structural strength of the acoustic port 31 will be affected, and the working life of the inverted tube 3 will be reduced. Therefore, when the diameter D2 of the sunken pit 311a is 2 mm~5 mm, the strength of the inverted tube 3 can be ensured and the production cost of the inverted tube 3 can be saved.

In a specific embodiment, as shown in FIG. 1, the shutter 1 is provided with an inverted hole 12, the end of the inverted tube 3 away from the speaker 2 is fixedly connected to the inverted hole 12, and the distance L1 from the inverted hole 12 to the speaker 2 is 250 mm~350 mm. For example, the distance L1 from the inverted hole 12 to the speaker 2 may specifically be 250 mm, 280 mm, 310 mm, 350 mm, and so on.

In this embodiment, one end of the inverted tube 3 is connected to the inverted hole 12, and the other end is close to the back of the speaker 2. Therefore, the distance L1 from the inverted hole 12 to the speaker 2 determines the length of the inverted tube 3. When the distance L1 from the inverted hole 12 to the speaker 2 is too small (for example, less than 250 mm), the space is too small, and it is inconvenient to set the inverted tube 3. When the distance L1 from the inverted hole 12 to the speaker 2 is too large (for example, greater than 350 mm), the length of the inverted tube 3 is too large, resulting in the inverted tube 3 taking up too much space, which will affect the settings of other components in the accommodation cavity 11. Therefore, when the distance L1 from the inverted hole 12 to the speaker 2 is 250 mm~350 mm, the space occupied by the inverted tube 3 can be saved, and the placement of the inverted tube 3 can be facilitated.

Figure 4:
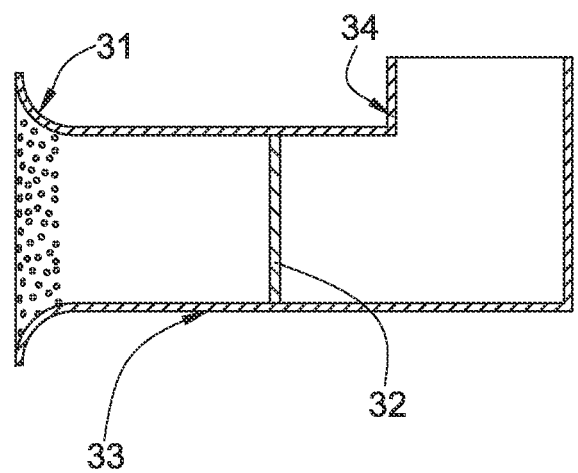
FIG. 4 illustrates an inverted tube in FIG. 2.

Wherein, the inverted hole 12 and the inverted tube 3 can be fixedly connected by means of bonding or welding. In a specific embodiment, as shown in FIG. 4, the inverted hole 12 is a circular hole, and the diameter D3 of the inverted hole 12 is 100 mm~150 mm. For example, the diameter D3 of the inverted hole 12 may specifically be 100 mm, 120 mm, 130 mm, 150 mm and so on.

In this embodiment, since the inverted tube 3 is connected to the inverted hole 12, the diameter D3 of the inverted hole 12 determines the cross-sectional area of the inverted tube 3. When the diameter D3 of the inverted hole 12 is too small (for example, less than 100 mm), the cross-sectional area of the inverted tube 3 is too small, which affects the vibration effect of the air in the inverted tube 3, resulting in a low loudness of the speaker 2. When the diameter D3 of the inverted hole 12 is too large (for example, greater than 150 mm), the cross-sectional area of the inverted tube 3 is too large. In order to ensure that the resonant frequency of the inverted tube 3 is the same as that of the speaker 2, the inverted tube 3 needs a longer length. As a result, the space occupied by the inverted tube 3 increases. Therefore, when the diameter D3 of the inverted hole 12 is 100 mm~150 mm, the loudness of the speaker 2 can be improved, and the space occupied by the inverted tube 3 can be saved.

The shape of the inverted hole 12 will not cause adverse effects on the sound. Therefore, as shown in FIG. 1, the inverted hole 12 may also be a square hole, a diamond hole, or an oval hole.

Figure 5:
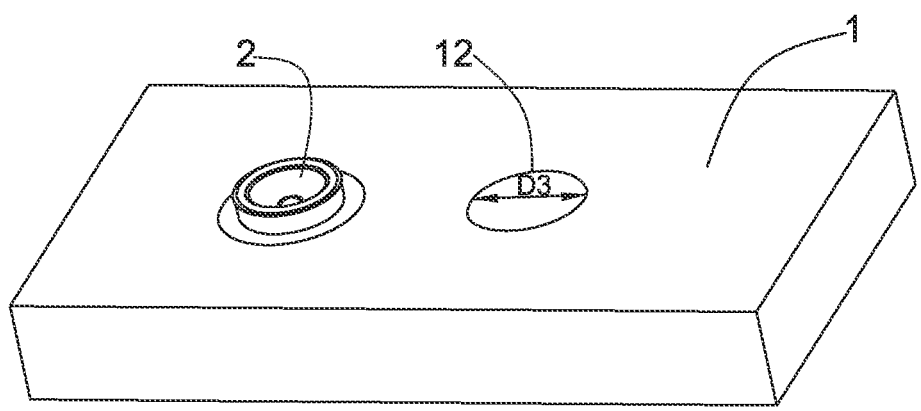
FIG. 5 is a simplified isometric view of a vehicle door in accordance with another embodiment of the present invention.

In a specific embodiment, as shown in FIG. 5, the inverted tube 3 includes a main body 33 and an installation part 34, the main body 33 is a straight-line shape, a wave shape or an arc shape, and the acoustic port 31 is located in the main body 33.

In this embodiment, the installation part 34 is used to connect the inverted hole 12 and the main body 33, so that the air in the main body 33 flows into the vehicle. Wherein, the shape of the main body 33 will not adversely affect the transmission of sound waves. Therefore, the main body 33 can be set in various shapes according to the space size of the accommodation cavity 11 and the specific use environment. As shown in the embodiment of FIG. 5, the main body 33 is a straight-line shape, and can also be a wave shape or an irregular arc shape.

Wherein, the main body 33 and the installation part 34 may be an integral structure of injection molding, or may be a split structure connected by bonding, welding or threading, which can reduce the volume of the mold and facilitate manufacturing.

In a specific embodiment, the minimum distance L2 from the inverted tube 3 to the bottom wall of the accommodation cavity 11 is 20 mm~50 mm. For example, the minimum distance L2 from the inverted tube 3 to the bottom wall of the accommodation cavity 11 may specifically be 20 mm, 30 mm, 40 mm, 50 mm and so on.

In this embodiment, when the minimum distance L2 from the inverted tube 3 to the bottom wall of the accommodation cavity 11 is too small (for example, less than 20 mm), the installation of the inverted tube 3 is difficult, and it is easy to rub against the bottom wall of the accommodation cavity 11, resulting in damage to the inverted tube 3. Therefore, when the minimum distance L2 from the inverted tube 3 to the bottom wall of the accommodation cavity 11 is 20 mm~50 mm, it can provide enough space for the installation of the inverted tube 3, and at the same time, it can minimize the volume of the accommodation cavity 11 and save space.

In a specific embodiment, as shown in FIG. 2, a noise reduction component 32 is arranged in the inverted tube 3, and the noise reduction component 32 is located at the middle part of the inverted tube 3 and is arranged along the radial direction of the inverted tube 3.

In this embodiment, the noise reduction component 32 is arranged with the function of sound absorption and noise reduction, which can play a secondary noise reduction effect on the airflow entering the inverted tube 3, further reducing the noise of the airflow, thereby improving the sound purity and further improving the sound quality of speaker 2.

The noise reduction component 32 may be a sound-absorbing cloth or a sound-absorbing board, wherein the sound-absorbing cloth is arranged with good air permeability and low price, and the air permeability can reach 70%, which can ensure the normal operation of the inverted tube 3.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vehicle door, installed on a vehicle, including:
    a shutter (1) having an accommodation cavity (11);
    a speaker (2) engaging with the shutter (1), including a sound membrane (21) facing an interior of the vehicle, and a rear cavity (22) under the sound membrane (21) communicating with the accommodation cavity (11);
    an inverted tube (3) located in the accommodation cavity (11) with one end thereof connected with the interior of the vehicle and another end formed with an acoustic port (31) exposed in the accommodation cavity (11) and facing the speaker (2) along a circumference of the inverted tube (3); wherein
    the acoustic port (31) has a flange (311); and
    the inverted tube (3) exports the sound from the rear cavity (22) into the vehicle along a same direction as a sound direction of the speaker so that the sound from the rear cavity (22) is superimposed with sound from a front side of the sound membrane (21).

2. The vehicle door as described in claim 1, wherein the flange (311) forms a sunken pit (311*a*).

3. The vehicle door as described in claim 2, wherein a plurality of the sunken pits (311*a*) is irregularly distributed on the flange (311).

4. The vehicle door as described in claim 3, wherein, a diameter D1 of the acoustic port (31) is 150 mm~300 mm.

5. The vehicle door as described in claim 4, wherein a diameter D2 of the sunken pit (311*a*) is 2 mm~~5 mm.

6. The vehicle door as described in claim 1, wherein the shutter (1) includes an inverted hole (12), and the inverted tube (3) has one end fixedly connected with the inverted hole (12); a distance L1 from the inverted hole (12) to the speaker (2) is 250 mm~350 mm.

7. The vehicle door as described in claim 6, wherein the inverted hole (12) is a circle; and a diameter D3 of the inverted hole (12) is 100 mm~150 mm.

8. The vehicle door as described in claim 7, wherein the inverted tube (3) includes a main body (33) and an installation part (34), and the main body (33) is a straight-line shape, wave shape or arc shape, the acoustic port (31) is located in the main body (33).

9. The vehicle door as described in claim 8, wherein the minimum distance L2 from the inverted tube (3) to the bottom wall of the accommodation cavity (11) is 20 mm~50 mm.

10. The vehicle door as described in claim 9, including a noise reduction component (32) in the inverted tube (3), wherein the noise reduction component (32) is located at a middle part of the inverted tube (3), and is arranged along a radial direction of the inverted tube (3).

* * * * *